US009420492B2

(12) United States Patent
Zheng et al.

(10) Patent No.: US 9,420,492 B2
(45) Date of Patent: Aug. 16, 2016

(54) METHOD AND DEVICE FOR LOAD BALANCE

(71) Applicant: Huawei Technologies Co., Ltd., Shenzhen, Guangdong (CN)

(72) Inventors: Ruobin Zheng, Shenzhen (CN); Hongyu Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 14/263,180

(22) Filed: Apr. 28, 2014

(65) Prior Publication Data

US 2014/0233387 A1    Aug. 21, 2014

Related U.S. Application Data

(63) Continuation of application No. PCT/CN2012/083135, filed on Oct. 18, 2012.

(30) Foreign Application Priority Data

Oct. 28, 2011   (CN) .......................... 2011 1 0341957

(51) Int. Cl.
*H04W 28/08*      (2009.01)
*H04L 29/08*      (2006.01)
*H04W 12/06*      (2009.01)
*H04L 12/803*     (2013.01)
*H04L 29/12*      (2006.01)

(52) U.S. Cl.
CPC ............. *H04W 28/08* (2013.01); *H04L 47/125* (2013.01); *H04L 67/1002* (2013.01); *H04L 67/1034* (2013.01); *H04W 12/06* (2013.01); *H04L 61/2015* (2013.01)

(58) Field of Classification Search
CPC .......... H04L 47/125; H04L 67/1002–67/1038; H04L 29/08153–29/08297
See application file for complete search history.

(56) References Cited

U.S. PATENT DOCUMENTS

2005/0226258 A1    10/2005  Chischportich et al.
2007/0263538 A1*   11/2007  Hueck ............... H04L 12/40176
                                                                370/232
2008/0101396 A1     5/2008  Miyata
(Continued)

FOREIGN PATENT DOCUMENTS

CN         1684448 A       10/2005
CN       101919209 A       12/2010
(Continued)

*Primary Examiner* — Pao Sinkantarakorn
(74) *Attorney, Agent, or Firm* — Leydig, Voit & Mayer, Ltd.

(57) ABSTRACT

The present invention relates to a method and device for a load balance. The device comprises: a selecting module, configured to select, according to a load state and fault state of each network edge node in a network edge node pool of an access network, a network edge node having the capacity of bearing a load to serve a user equipment from the network edge node pool when a message including information indicating that the user equipment intends to access a network is received; and a sending module, configured to send a message for indicating the selected network edge node to serve the user equipment to the selected network edge node. The method and device of the present invention can improve a utilization rate of a network edge node and lower the requirement for the capacity of the network edge node.

12 Claims, 9 Drawing Sheets

(56) References Cited

U.S. PATENT DOCUMENTS

2008/0186982 A1* 8/2008 Chang ............... H04L 47/125
            370/400
2010/0095004 A1* 4/2010 Zuckerman ......... H04L 67/1008
            709/226
2010/0309784 A1  12/2010 Mihaly et al.

FOREIGN PATENT DOCUMENTS

| CN | 102098354 A | 6/2011 |
|----|-------------|--------|
| JP | 2006101352 A | 4/2006 |
| WO | WO 2009092441 A1 | 7/2009 |
| WO | WO 2011062542 A1 | 5/2011 |

* cited by examiner

METHOD AND DEVICE FOR LOAD BALANCE

CROSS-REFERENCE TO RELATED APPLICATIONS

This application is a continuation of International Patent Application No. PCT/CN2012/083135, filed on Oct. 18, 2012, which claims priority to Chinese Patent Application No. 201110341957.9, filed on Oct. 28, 2011, both of which are hereby incorporated by reference in their entireties.

TECHNICAL FIELD

The present invention relates to a method and a device for a load balance.

BACKGROUND

FIG. 1 shows a schematic diagram of a reference architecture of a general network. As shown in FIG. 1, the general network includes a customer premises network (CPN: Customer Premises Network), an access network and a service provider (SP: Service Provider). A customer premises network may be connected with an access network, and includes a user equipment (UE: User Equipment) and a residential gateway (RG: Residential Gateway). An access network includes an access node (AN: Access Node), a network edge node (EN: Edge Node) and an aggregation network located between the AN and the network EN. A SP may be connected with an access network, which may be an application SP (ASP: Application SP) or a network SP (NSP: Network SP). When a user equipment in a premises network intends to access a network and connects with a service provider to acquire a desired service, one network edge node in an access network will be assigned to serve the UE.

A general network may be a wireless network, a digital subscriber line (DSL: Digital Subscriber Line) network or a passive optical network (PON: Passive Optical Network). If a general network is a wireless network, a network edge node in an access network is a wireless gateway, and an access node in an access network is a base station (BS: Base Station). If a general network is a DSL network, a network edge node in an access network may be a broadband remote access server (BRAS: Broadband Remote Access Server), a broadband network gateway (BNG: Broadband Network Gateway) or a broadband service gateway (BSG: Broadband Service Gateway). An access node in an access network is a digital subscriber line access multiplexer (DSLAM: DSL Access Multiplexer). A premises network is inter-connected with a DSL network by a DSL access technology. If a general network is a PON, a network edge node in an access network is a BRAS or a BNG. An access node in an access network is an optical line termination (OLT: Optical Line Termination). A premises network is inter-connected with an access network by a passive optical network access technology.

Traditionally, a centralized deployment mode is adopted for network edge nodes of an access network. Namely, the network edge nodes are centrally deployed on an aggregation network of the access network which is far away from a user equipment, so that each network edge node may serve more areas. However, this centralized deployment mode of network edge nodes needs to consume more bandwidth of metropolitan area network, which causes a bottleneck of a network performance, and which is not favorable for deploying new services such as a content delivery network (CDN: Content Delivery Network) as such new services require a network edge node gets closer to a user equipment.

In order to overcome the above-mentioned defects of the centralized deployment mode, a distributed deployment mode is adopted for network edge nodes of an access network at present. Namely, the network edge nodes are moved down and distributedly deployed to an aggregation network of the access network. By adopting a distributed deployment mode, served area of each network edge node in an access network is decreased, but is closer to a user equipment, thereby being better for a deployment of new services and a promotion of bandwidth of a user equipment.

However, there also exists a problem when adopting a distributed deployment mode for deploying network edge nodes in an access network. Specifically, suppose that a network edge node B1 serves an urban area and a network edge node B2 serves a suburb. During the daytime, most the people go to work from the suburb area to the urban area. Therefore most people enter a network through the network edge node B1, and few people enter a network through the network edge node B2. As a result, a load of the network edge node B1 is very high, and the requirement for the capacity of the network edge node B1 is correspondingly very high in order to bear a pressure from a peak value of a service. And a load of the network edge node B2 is very low, which is equivalent that the network edge node B2 is idle during the daytime. Conversely, at night, people go back to the suburb area from the urban area. Thus a lot of people enter the network through the network edge node B2, and few people enter the network through the network edge node B1. As a result, the load of the network edge node B2 is very high, and the requirement for the capacity of the network edge node B2 is correspondingly very high to bear the pressure from the peak value of a service. And the load of the network edge node B1 is very low, which is equivalent that the network edge node B1 is idle at night. The foregoing description is a tidal effect of people as to a network use.

Apparently, when network edge nodes in an access network are deployed by adopting a distributed deployment mode, a network edge node in the access network which has a low utilization rate, requires a high capacity due to the tidal effect of people as to a network use.

SUMMARY

In view of the above-mentioned problem of the prior art, embodiments of the present invention provide a method and a device for a load balance, which can improve a utilization rate of a network edge node and lower the requirement for capacity of the network edge node.

A method for a load balance according to an embodiment of the present invention, comprises steps: selecting, when a message including information indicating that a user equipment intends to access a network is received, a network edge node having capability of bearing a load to serve the user equipment, according to a load state and fault state of each network edge node in a network edge node pool of an access network, from the network edge node pool; and sending a message for indicating the selected network edge node to serve the user equipment to the selected network edge node.

A method for a load balance according to an embodiment of the present invention, comprises steps: indicating, when a network edge node of an access network receives a message including information indicating that a user equipment intends to access a network, the network edge node to enter a waiting state; and informing, if the network edge node receives a message for indicating the network edge node to serve the user equipment from one device during the waiting state, the user equipment, through the network edge node, that it is served by the network edge node.

A device for a load balance according to an embodiment of the present invention, comprises: a selecting module, configured to select, when a message including information indicating that a user equipment intends to access a network is received, a network edge node having the capacity of bearing a load to serve the user equipment, according to a load state and fault state of each network edge node in a network edge node pool of an access network, from the network edge node pool; and a sending module, configured to send a message for indicating the selected network edge node to serve the user equipment to the selected network edge node.

A device for a load balance according to an embodiment of the present invention, comprises: an indicating module, configured to indicate, when a network edge node of an access network receives a message including information indicating that a user equipment intends to access a network, the network edge node to enter a waiting state; and an informing module, configured to inform, if the network edge node receives a message for indicating the network edge node to serve the user equipment from one device during the waiting state, the user equipment, through the network edge node, that it is served by the network edge node.

A method capable of being executed by a network edge node of an access network according to an embodiment of the present invention, comprises steps: entering, when a message including information indicating that a user equipment intends to access a network is received, a waiting state; and informing, if a message for indicating the network edge node to serve the user equipment is received from one device during the waiting state, the user equipment it is served by the network edge node.

A device for a load balance according to an embodiment of the present invention, comprises: a memory, configured to store executable instructions; and a processor, configured to execute, according to the executable instructions, the following steps: selecting, when a message including information indicating that a user equipment intends to access a network is received, a network edge node having capability of bearing a load to serve the user equipment, according to a load state and fault state of each network edge node in a network edge node pool of an access network, from the network edge node pool; and sending a message for indicating the selected network edge node to serve the user equipment to the selected network edge node.

A network edge node of an access network according to an embodiment of the present invention, comprises: a memory, configured to store executable instructions; and a processor, configured to execute, according to the executable instructions, the following steps: entering, when a message including information indicating that a user equipment intends to access a network is received, a waiting state; and informing, if a message for indicating the network edge node to serve the user equipment is received from one device during the waiting state, the user equipment it is served by the network edge node.

A machine readable medium according to an embodiment of the present invention stores executable instructions. When the executable instructions are executed, a machine executes the following steps: selecting, when a message including information indicating that a user equipment intends to access a network is received, a network edge node having capability of bearing a load to serve the user equipment, according to a load state and fault state of each network edge node in a network edge node pool of an access network, from the network edge node pool; and sending a message for indicating the selected network edge node to serve the user equipment to the selected network edge node.

A machine readable medium according to an embodiment of the present invention stores executable instructions. When the executable instructions are executed, a machine executes the following steps: indicating, when a network edge node of an access network receives a message including information indicating that a user equipment intends to access a network, the network edge node to enter a waiting state; and informing, if the network edge node receives a message for indicating the network edge node to serve the user equipment from one device during the waiting state, the user equipment, through the network edge node, that it is served by the network edge node.

According to a solution disclosed in an embodiment of the present invention, a user equipment in each area is not merely served by a certain network edge node, but can be served by each network edge node in the network edge node pool. As a result, the requirement for the capacity of each network edge node can be greatly reduced. Moreover, each network edge node does not merely serve user equipments in a certain area, but can serve user equipments in multiple areas, so a utilization rate of each network edge node can be greatly improved.

BRIEF DESCRIPTION OF DRAWINGS

Other features, characteristics, benefits and advantages of the present invention will become more obvious in combination with detailed descriptions below.

DESCRIPTION OF EMBODIMENTS

Embodiments of the present invention disclose a technical solution for a load balance. In the technical solution, firstly, a network edge node pool for serving user equipments in multiple areas is formed by using multiple network edge nodes which are moved down to an aggregation network of an access network, and a load balancing device is provided. Then, when any user equipment in the multiple areas intends to access a network, the load balancing device selects, according to a load state and a fault state of each network edge node in the network edge node pool, a network edge node having a capacity of bearing a load for serving the user equipment which intends to access the network from the network edge nodes of the network edge node pool, and informs the selected network edge node to serve the user equipment which intends to access the network. Finally, the user equipment which intends to access the network is merely served by the selected network edge node in multiple network edge nodes of the network edge node pool.

According to a technical solution disclosed in embodiments of the present invention, a user equipment in each area is not merely served by a certain network edge node, but can be served by each network edge node in a network edge node pool. As a result, the capacity requirement of each network edge node can be highly reduced. Moreover, according to a technical solution disclosed in embodiments of the present invention, each network edge node does not merely serve a user equipment in a certain area, but can serve a user equipment in multiple areas. Thus, the utilization rate of each network edge node can be greatly improved.

Each embodiment of the present invention is described in details below in combination with accompanying drawings. It should be understood by those skilled in the art that, an objective of each embodiment described blow is merely used for describing each aspect of the present invention in details, rather than limiting the protection scope of the present invention. Moreover, "a first embodiment", "a second embodiment", "a third embodiment", "a fourth embodiment", "a fifth embodiment", "a sixth embodiment" and "a seventh embodiment" mentioned below are merely used for identifying each embodiment, rather than expressing that some embodiments are better than other embodiments.

Figure 1:
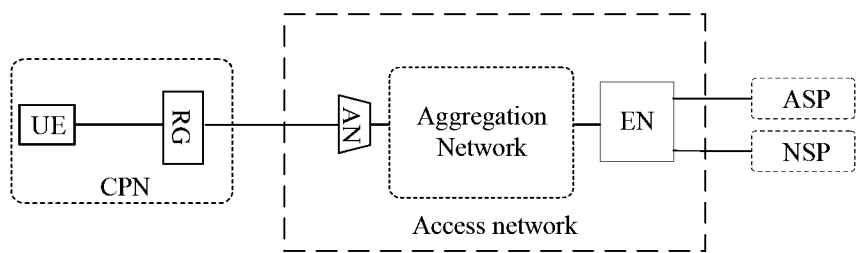
FIG. 1 shows a schematic diagram of a reference architecture of a general network.
Figure 2:
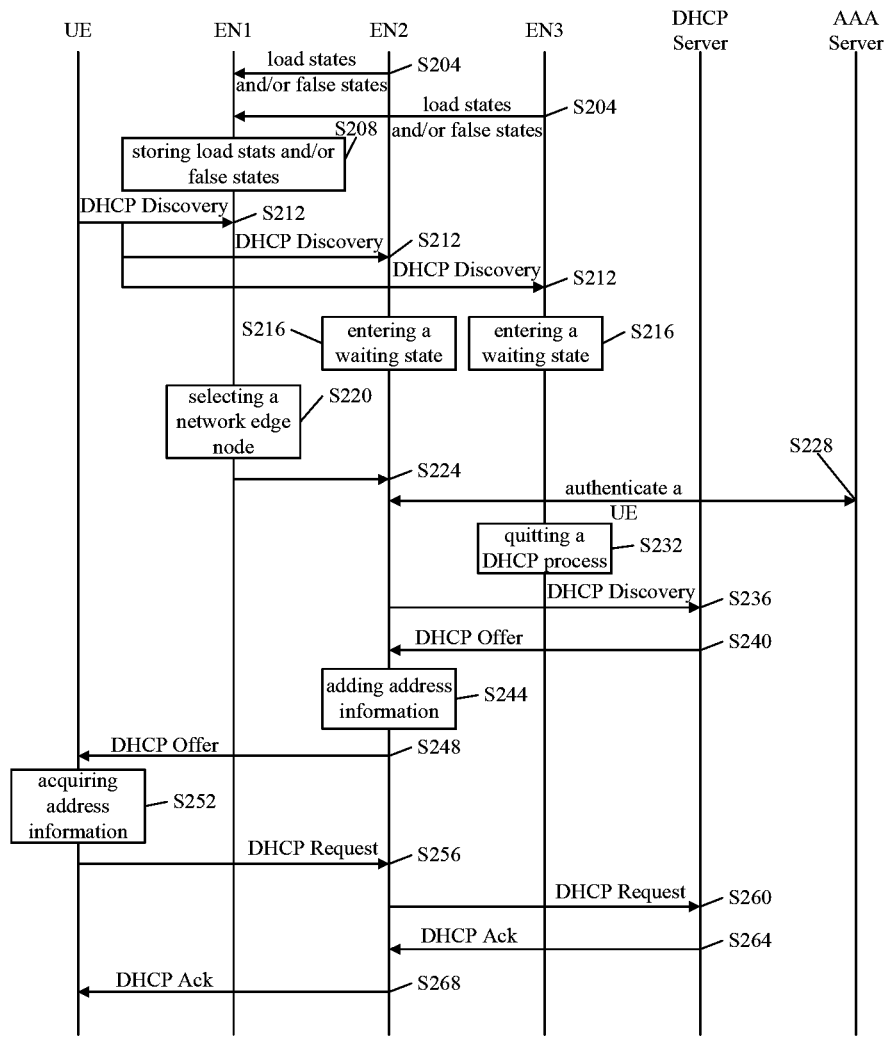
FIG. 2 shows a flow schematic diagram of a method for a load balance according to the first embodiment of the present invention.

Now refer to FIG. 2, which shows a flow schematic diagram of a method for a load balance according to the first embodiment of the present invention. In the first embodiment, a load balancing device is a network edge node in a network edge node pool of an access network. A user equipment in a residential network accesses a network by using a dynamic host configuration protocol (DHCP: Dynamic Host Configuration Protocol) process. For convenience of description, it is supposed that a network edge node pool of an access network merely includes three network edge nodes EN1, EN2 and EN3, and a load balancing device is the network edge node EN1. The network edge nodes EN1, EN2 and EN3 may be but are not limit to a wireless gateway, BRAS, BNG or BSG. Those skilled in the art should understand that, it is merely for convenience of description in the embodiment to set the number of network edge nodes in a network edge node pool as three. Actually, the network edge nodes in the network edge node pool may be in any number.

As shown in FIG. 2, in step S204, if a load change and/or fault occur(s) in the network edge nodes EN1, EN2 and/or EN3, the network edge nodes EN1, EN2 and/or EN3 send(s) the load change and/or fault to the network edge nodes EN1 which is taken as the load balancing device.

In step S208, when the load state and/or fault state is received from the network edge nodes EN1, EN2 and/or EN3, the network edge node EN1 stores the received load state and/or fault state.

In step S212, if any user equipment UE in a residential network intends to access a network to acquire a desired serving service from a service provider SP, an address allocation discovery (DHCP Discovery) message is broadcasted by the user equipment UE. The DHCP Discovery message broadcasted by the user equipment UE includes identification information of the user equipment UE, such as an access loop (like a line identifier (ID)) of the user equipment UE, a media access control (MAC: Media Access Control) address of a residential network of the UE or a virtual local area network (VLAN: Virtual Local Area Network) identifier. In here, all the network edge nodes EN1, EN2 and EN3 in the network edge node pool may receive the DHCP Discovery message broadcasted by the user equipment UE. Since the DHCP Discovery message is sent when the user equipment UE intends to access the network, the DHCP Discovery message is a message including information indicating that the UE intends to access the network in the embodiment.

In step S216, when the network edge nodes EN2 and EN3 receive the DHCP Discovery message from the user equipment UE, the network edge nodes EN2 and EN3 enter a waiting state.

In step S220, when the network edge node EN1 which is taken as the load balancing device receives the DHCP Discovery message from the user equipment UE, a network edge node having the capacity of bearing a load to serve the user equipment UE is selected from the network edge node pool by the network edge node EN1 according to load states and fault states of the stored network edge nodes EN1, EN2 and EN3 in the network edge node pool.

In here, the network edge node EN1 may select the network edge node for serving the user equipment UE by using various load balancing strategies. For example, the network edge node EN1 may select a network edge node in the network edge nodes EN1, EN2 and EN3, which does not have a fault and has the smallest load, for serving the UE. For another example, the network edge node EN1 may select a network edge node which has the capability of bearing the load and is closest to the user equipment UE, for serving the UE. For another example, the network edge node EN1 may arrange, according to a certain rule, the network edge nodes EN1, EN2 and EN3 which do not have a fault as follows: a first network edge node, a second network edge node and a third network edge node. When a user equipment intends to access the network every time, the first network edge node is always selected first to serve the user equipment which intends to access the network till the first network edge node is full of load and does not have the capability of bearing a load any more. Then the second network edge node is always selected to serve a user equipment which intends to access the network till the second network edge node is full of load and does not have the capability of bearing a load any more. Finally, the third network edge node is always selected to serve a user equipment which intends to access the network till the third network edge node is full of load and does not have the capability of bearing the load any more.

In step S224, a message for indicating a selected network edge node to serve the user equipment UE is sent to the selected network edge node by the network edge node EN1 which is taken as the load balancing device, wherein the message sent by the network edge node EN1 includes identification information of the user equipment UE. In here, for convenience of description, it is supposed that the selected network edge node is the network edge node EN2.

In step S228, when the network edge node EN2 receives a message for indicating the network edge node EN2 to serve the user equipment UE from the network edge node EN1 during the waiting state, the network edge node EN2 is interacted with an authentication, authorization and accounting (AAA: Authentication, Authorization and Accounting) server which is taken as a user authentication device to perform a user authentication of the user equipment UE.

In step S232, when the waiting of the network edge node EN3 timeouts, a DHCP process of the user equipment UE is quit by the network edge node EN3. For example, the network edge node EN3 may quit the DHCP process of the user equipment UE by abandoning the DHCP Discovery message from the user equipment UE.

In step S236, if the user authentication of the user equipment UE is passed, the DHCP Discovery message from the user equipment UE is sent to a DHCP server by the network edge node EN2.

In step S240, an address allocation service confirmation (DHCP Offer) message is returned to the network edge node EN2 by the DHCP server.

In step S244, address information of the network edge node EN2 is added, by the network edge node EN2, to the DHCP Offer message received from the DHCP server in order to inform the user equipment UE that it is served by the network edge node EN2. For example, the network edge node EN2 may add the address information to the received DHCP Offer message by inserting a router option (Router Option).

In step S248, the DHCP Offer message including the address information of the network edge node EN2 is sent to the user equipment UE by the network edge node EN2.

In step S252, when the DHCP Offer message is received from the network edge node EN2, address information of the network edge node EN2 is acquired from the received DHCP Offer message by the user equipment UE, thereby knowing that it is served by the network edge node EN2.

In step S256, an address allocation request (DHCP Request) message is sent, by the user equipment UE, to the network edge node EN2 which it is served.

In step S260, when the DHCP Request message from the user equipment UE is received, the received DHCP Request message is forwarded to the DHCP server by the network edge node EN2.

In step S264, an address allocation acknowledgement (DHCP Ack) message is returned to the network edge node EN2 by the DHCP server.

In step S268, when the DHCP Ack message from the DHCP server is received, the received DHCP Ack message is sent to the user equipment UE by the network edge node EN2.

It should be understood for those skilled in the art that, although in the first embodiment, the network edge nodes EN1, EN2 and EN3 actively send load states and/or fault states to the network edge node EN1 which is taken as a load balancing device, the present invention however is not limited to this. In other embodiments of the present invention, when the network edge node EN1 selects a network edge node for serving the user equipment UE, the network edge node EN1 indicates the network edge nodes EN1, EN2 and EN3 to send load states and/or fault states. Then the network edge nodes EN1, EN2 and EN3 send the load states and/or fault states to the network edge node EN1.

It should be understood for those skilled in the art that, in the first embodiment, the network edge nodes EN1, EN2 and EN3 may send load states to the network edge node EN1 which is taken as a load balancing device once the loads are changed or when loads are changed and exceed a predefined load threshold.

It should be understood for those skilled in the art that, although in the first embodiment, a user authentication is needed for the user equipment UE, and the network edge node EN2 which is selected for serving the user equipment UE informs the user equipment UE that it is served by the network edge node EN2 when the user equipment UE passes the user authentication, the present invention is not limited to this. In some other embodiments of the present invention, the user equipment UE may be informed that it is served by the network edge node EN2 without performing a user authentication of the user equipment UE by the network edge node EN2 which is selected for serving the user equipment.

It should be understood for those skilled in the art that, although in the first embodiment, the network edge node EN2 which is selected for serving the user equipment UE informs, through sending the DHCP Offer message including the address information of the network edge node EN2 to the user equipment UE, the user equipment UE that it is served by the network edge node EN2, the present invention is not limited to this. In some other embodiments of the present invention, a newly customized message including address information of the network edge node EN2 may be directly sent to the user equipment UE when the network edge node EN2 is selected for serving the user equipment UE, in order to inform the UE that it is served by the network edge node EN2.

It should be understood for those skilled in the art that, although in the first embodiment, the network edge node EN2 which is selected for serving the UE informs, through sending a DHCP Offer message including address information of the network edge node EN2 to the user equipment UE, the user equipment UE that it is served by the network edge node EN2, the present invention is not limited to this. In some other embodiments of the present invention, it also could be that the network edge node EN2 which is selected for serving the user equipment UE adds address information of the network edge node EN2 to a DHCP Ack (rather than the DHCP Offer message received from the DHCP server) message received from the DHCP server. Then the network edge node EN2 sends the DHCP Ack message including the address information of the network edge node EN2 to the user equipment UE to inform the user equipment UE that it is served by the network edge node EN2.

It should be understood for those skilled in the art that, although in the first embodiment, the network edge node EN1 is supposed as a load balancing device, the present invention is not limited to this. In some other embodiments of the present invention, the load balancing device may also be any other network edge node in the network edge node pool.

Figure 3:
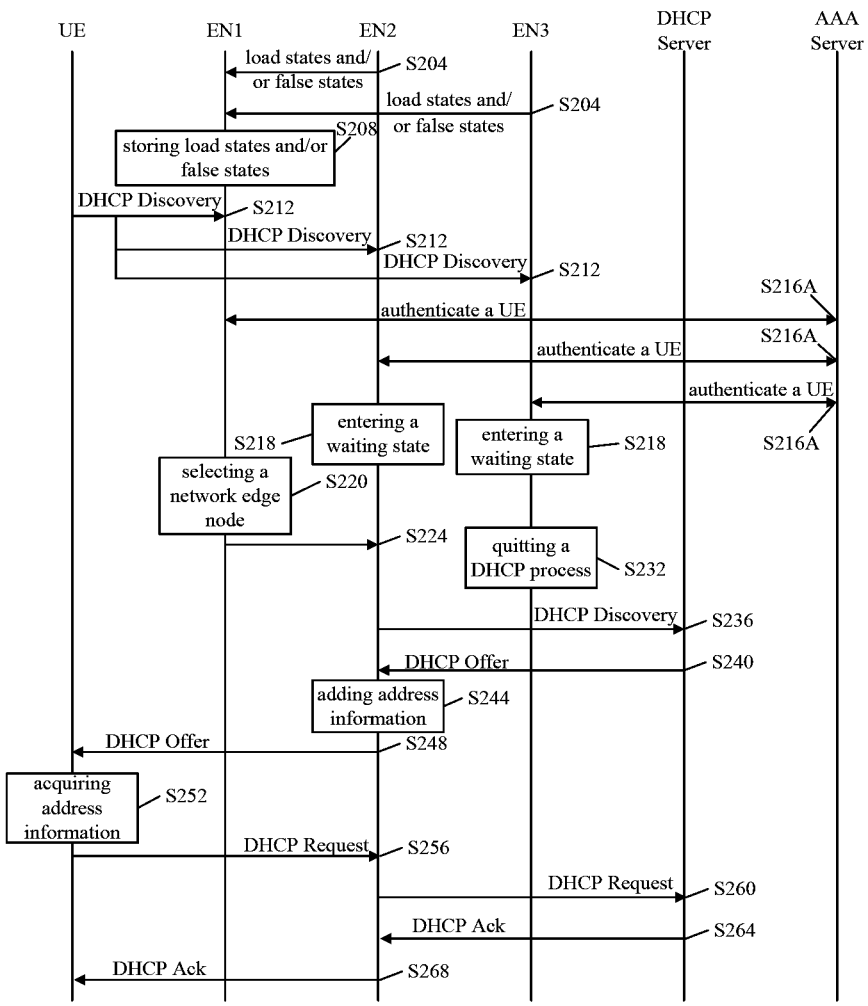
FIG. 3 shows a flow schematic diagram of a method for a load balance according to the second embodiment of the present invention.

Now refer to FIG. 3, which shows a flow schematic diagram of a method for a load balance according to the second embodiment of the present invention. Other parts of the second embodiment are basically the same as the first embodiment except the difference of time for performing a user authentication of a user equipment UE. For simplification, only a part of the second embodiment which is different from the first embodiment is described below, and the same parts of the two will not be described redundantly.

In step S216A, when the network edge nodes EN1, EN2 and EN3 receive the DHCP Discovery message from the user equipment UE, the network edge nodes EN1, EN2 and EN3 respectively interact with an AAA server which is taken as a user authentication device, to perform a user authentication of the user equipment UE.

In step S218, when the user authentication result of the user equipment UE is received from the AAA server, the network edge nodes EN2 and EN3 enter waiting states.

From the description above, in the second embodiment, the time for performing a user authentication of the user equipment UE is earlier, so the DHCP process is accelerated.

Figure 4:
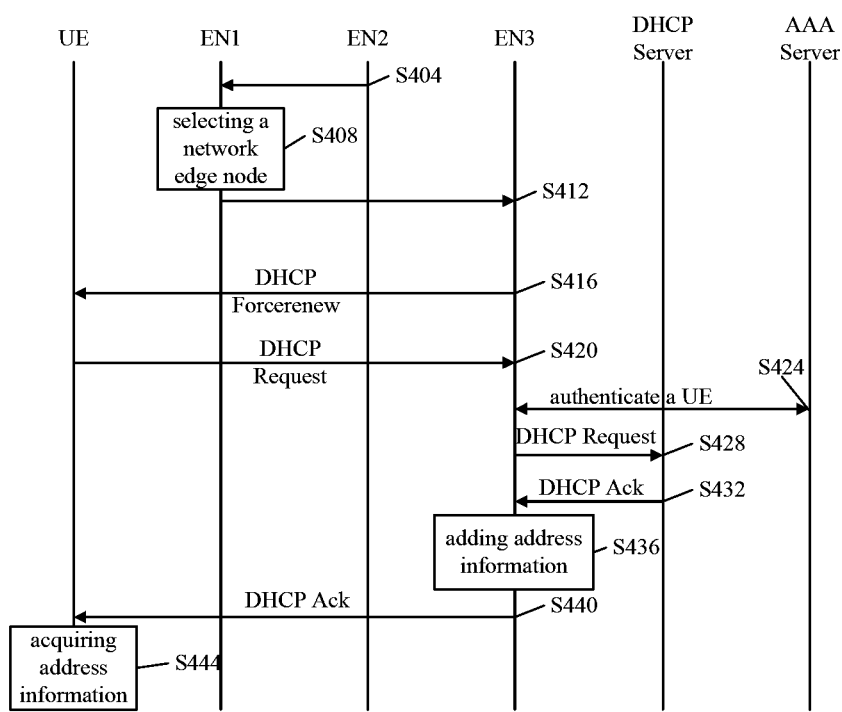
FIG. 4 shows a flow schematic diagram of a method for a load balance according to the third embodiment of the present invention.

Now refer to FIG. 4, which shows a flow schematic diagram of a method for a load balance according to the third embodiment of the present invention. In here, as in the first embodiment, for convenience of description, it is supposed that a network edge node pool of an access network merely includes three network edge nodes EN1, EN2 and EN3, and the network edge node EN1 is a load balancing device, which is the same with the first embodiment.

As shown in FIG. 4, in step S404, if any network edge node in a network edge node pool cannot continuously serve a user equipment currently served by the network edge node, the any network edge node sends a message indicating migrating the user equipment to the network edge node EN1 which is taken as a load balancing device, wherein the message includes identification information of the user equipment currently served by the any network edge node which needs to be migrated. In here, the any network edge node cannot continuously serve the user equipment due to the following reasons: disaster recovery backup, green energy-saving requirement or fault occurrence. For convenience of description below, it is supposed that the any network edge node is the network edge node EN2, and the user equipment currently served by the network edge node EN2 is the user equipment UE.

In step S408, when the message indicating migrating a user equipment is received from the network edge node EN2, a network edge node having the capacity of bearing a load to serve the UE being migrated is selected from the network edge node pool by the network edge node EN1 which is taken as the load balancing device according to stored load states and fault states of the network edge nodes EN1, EN2 and EN3 in the network edge node pool. In here, it is supposed that the network edge node selected at this time is the network edge node EN3.

In step S412, a message for indicating the network edge node EN3 to serve the UE being migrated is sent to the selected network edge node EN3 by the network edge node EN1 which is taken as the load balancing device, wherein the message sent by the network edge node EN1 includes identification information of the user equipment UE being migrated.

In step S416, when the message for indicating the network edge node EN3 to serve the user equipment UE being migrated from the network edge node EN1 is received, a DHCP Forcerenew (DHCP Forcerenew) message is sent to the user equipment UE by the network edge node EN3, to prompt the user equipment UE to execute the DHCP Forcerenew.

In step S420, when the DHCP Forcerenew message from the network edge node EN3 is received, a DHCP Request message is sent to the network edge node EN3 by the user equipment UE.

In step S424, when the DHCP Request message from the user equipment UE is received, the network edge node EN3 interacts with an AAA server to perform a user authentication of the UE.

In step S428, if the user equipment UE passes the user authentication, the DHCP Request message from the user equipment UE is forwarded to a DHCP server by the network edge node EN3.

In step S432, a DHCP Ack message is returned to the network edge node EN3 by the DHCP server.

In step S436, when the DHCP Ack message from the DHCP server is received, address information of the network edge node EN3 is added to the received DHCP Ack message by the network edge node EN3.

In step S440, the DHCP Ack message including the address information of the network edge node EN3 is sent to the user equipment UE by the network edge node EN3 to inform the user equipment UE that which it is served by has changed to the network edge node EN3.

In step S444, when the DHCP Ack message from the network edge node EN3 is received, the address information of the network edge node EN3 is extracted from the DHCP Ack message by the user equipment UE to know that which it is served by has changed to the network edge node EN3.

It should be understood for those skilled in the art that, although in the third embodiment, the network edge node EN3 which is selected for serving the user equipment UE being migrated informs, through sending the DHCP Ack message including the address information of the network edge node EN3 to the user equipment UE, the user equipment UE that which it is served by has changed to the network edge node EN3, the present invention however is not limited to this. In some other embodiments of the present invention, the network edge node EN3 may directly send a newly customized message including the address information of the network edge node EN3 to the user equipment UE to inform the user equipment UE that which it is served by has changed to the network edge node EN3 when the network edge node EN3 is selected for serving the user equipment UE being migrated.

Figure 5:
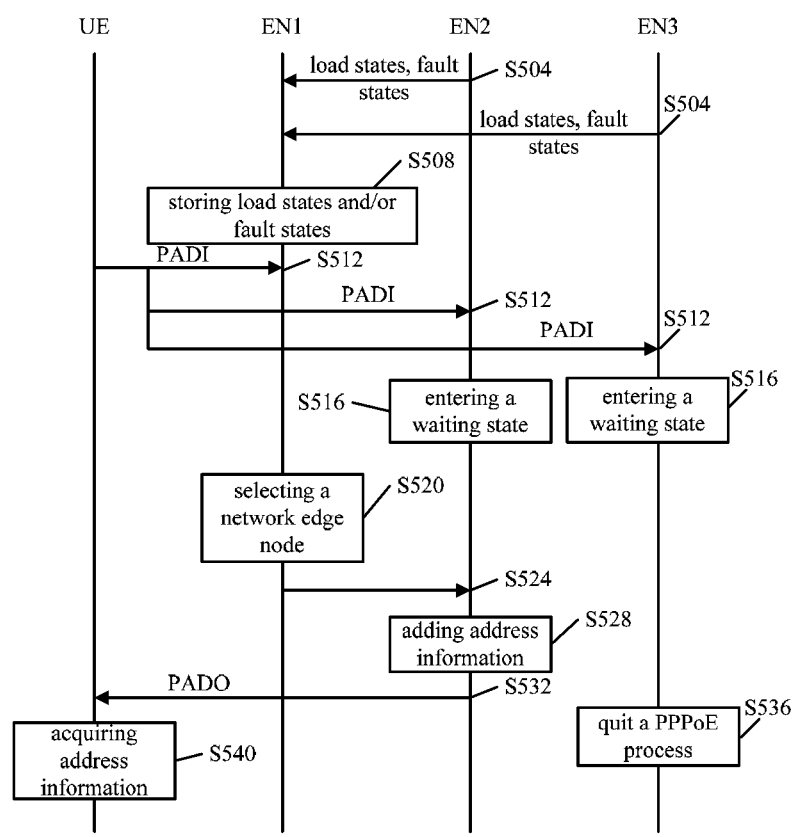
FIG. 5 shows a flow schematic diagram of a method for a load balance according to the fourth embodiment of the present invention.

Now refer to FIG. 5, which shows a flow schematic diagram of a method for a load balance according to the fourth embodiment of the present invention. In the fourth embodiment, a load balancing device is a network edge node in a network edge node pool of an access network. A user equipment in a residential network accesses a network by using a point-to-point protocol over Ethernet (PPPoE: Point-to-Point Protocol over Ethernet) process. For convenience of description, it is supposed that the network edge node pool of the access network merely includes three network edge nodes EN1, EN2 and EN3, and the load balancing device is the network edge node EN1. The network edge nodes EN1, EN2 and EN3 may be but not limit to a wireless gateway, BRAS, BNG or BSG. It should be understood for those skilled in the art that, in the embodiment, it is merely for convenience of description to set the number of the network edge nodes in the network edge node pool as three. Actually, the network edge nodes in the network edge node pool may be in any number.

As shown in FIG. 5, in step S504, if load changes and/or faults occur in the network edge nodes EN1, EN2 and/or EN3, the network edge nodes EN1, EN2 and/or EN3 send their load states and/or fault states to the network edge node EN1 which is taken as the load balancing device.

In step S508, when the load states and/or fault states from the network edge nodes EN1, EN2 and/or EN3 are received, the received load states and/or fault states are stored by the network edge node EN1.

In step S512, if any user equipment UE in a residential network intends to access a network to acquire a desired service from an SP, the user equipment UE performs an active discovery initiation stage of a PPPoE discovery stage to broadcast a point-to-point protocol over ethernet discovery (PADI: PPPoE Active Discovery Initiation) message. The PADI message broadcasted by the user equipment UE includes identification information of the user equipment UE, such as an access loop (like line identifier) of the user equipment UE, an MAC address of a residential network of the user equipment UE or a ULAN identifier. In here, all the network edge nodes EN1, EN2 and EN3 in the network edge node pool may receive the PADI message broadcasted by the user equipment UE. Since the PADI message is sent when the user equipment UE intends to access a network, the PADI message is a message including information expressing that the user equipment UE intends to access the network in the embodiment.

In step S516, when the network edge nodes EN2 and EN3 receive the PADI message from the user equipment UE, the network edge nodes EN2 and EN3 enter waiting states.

In step S520, when the PADI message from the user equipment UE is received, a network edge node having the capacity of bearing a load to serve the user equipment UE is selected from the network edge node pool by the network edge node EN1 which is taken as a load balancing device according to stored load states and fault states of the network edge nodes EN1, EN2 and EN3 in the network edge node pool.

In here, the network edge node EN1 may select the network edge node for serving the user equipment UE by using various load balancing strategies. For example, the network edge node EN1 may select a network edge node in the network edge nodes EN1, EN2 and EN3, which does not have a fault and has the smallest load, for serving the UE. For another example, the network edge node EN1 may select a network edge node which has the capability of bearing the load and is closest to the user equipment UE, for serving the UE. For another example, the network edge node EN1 may arrange, according to a certain rule, the network edge nodes EN1, EN2 and EN3 which do not have a fault as follows: a first network edge node, a second network edge node and a third network edge node. When a user equipment intends to access the network every time, the first network edge node is always selected first to serve the user equipment which intends to access the network till the first network edge node is full of load and does not have the capability of bearing a load any more. Then the second network edge node is always selected to serve a user equipment which intends to access the network till the second network edge node is full of load and does not have the capability of bearing a load any more. Finally, the third network edge node is always selected to serve a user equipment which intends to access the network till the third network edge node is full of load and does not have the capability of bearing the load any more.

In step S524, a message for indicating the selected network edge node to serve the user equipment UE is sent to the selected network edge node by the network edge node EN1 which is taken as the load balancing device, wherein the message sent by the network edge node EN1 includes identification information of the user equipment UE. In here, for convenience of description, it is supposed that the selected network edge node is the network edge node EN2.

In step S528, when the network edge node EN2 receives the message from the network edge node EN1, which indicating the network edge node EN2 to serve the user equipment UE during the waiting state, a PPPoE active discovery offer stage of a PPPoE discovery stage is entered. Address information of the network edge node EN2 is added, by the network edge node EN2, to a PPPoE active discovery offer (PADO: PPPoE Active Discovery Offer) message responding to the PADI message, thereby informing the user equipment UE it is served by the network edge node EN2. In here, address information of the network edge node EN2 may be an MAC address of the network edge node EN2.

In step S532, the PADO message including the address information of the network edge node EN2 is sent to the user equipment UE by the network edge node EN2.

In step S536, when the waiting of the network edge node EN3 timeouts, a PPPoE process of the user equipment UE is quit by the network edge node EN3. For example, the network edge node EN3 may quit the PPPoE process of the user equipment UE by abandoning the PADI message from the user equipment UE.

In step S540, when the PADO message is received from the network edge node EN2, the address information of the network edge node EN2 is acquired from the received PADO message by the user equipment UE to know that it is served by the network edge node EN2.

Then, the user equipment UE completes other remaining operations of the PPPoE discovery stage under the service of the network edge node EN2, and enters a normal PPPoE data transmission stage. As the other remaining operations of the PPPoE discovery stage is known by those skilled in the art, it will not be described redundantly herein.

It should be understood for those skilled in the art that, although in the fourth embodiment, the network edge nodes EN1, EN2 and EN3 actively send the load states and/or fault states to the network edge node EN1 which is taken as the load balancing device, the present invention is not limited to this. In some other embodiments of the present invention, when the network edge node EN1 selects a network edge node for serving the user equipment UE, the network edge node EN1 indicates the network edge nodes EN1, EN2 and EN3 to send load states and fault states. Then the network edge nodes EN1, EN2 and EN3 send the load states and fault states to the network edge node EN1.

It should be understood for those skilled in the art that, in the fourth embodiment, the network edge nodes EN1, EN2 and EN3 may send load states to the network edge node EN1 which is taken as the load balancing device once a load is changed or when a load is changed and exceeds a predefined load threshold.

It should be understood for those skilled in the art that, although in the fourth embodiment, the network edge node EN2 which is selected for serving the user equipment UE informs, through sending the PADO message including the address information of the network edge node EN2 to the user equipment UE, the user equipment UE it is served by the network edge node EN2, the present invention is not limited to this. In some other embodiments of the present invention, when the network edge node EN2 is selected for serving the user equipment UE, the network edge node EN2 directly sends a newly customized message including the address information of the network edge node EN2 to the user equipment UE to inform the user equipment UE it is served by the network edge node EN2.

It should be understood for those skilled in the art that, although in the fourth embodiment, it is supposed that the network edge node EN1 is a load balancing device, the present invention is not limited to this. In some other embodiments of the present invention, the load balancing device may be any other network edge node in the network edge node pool.

Figure 6:
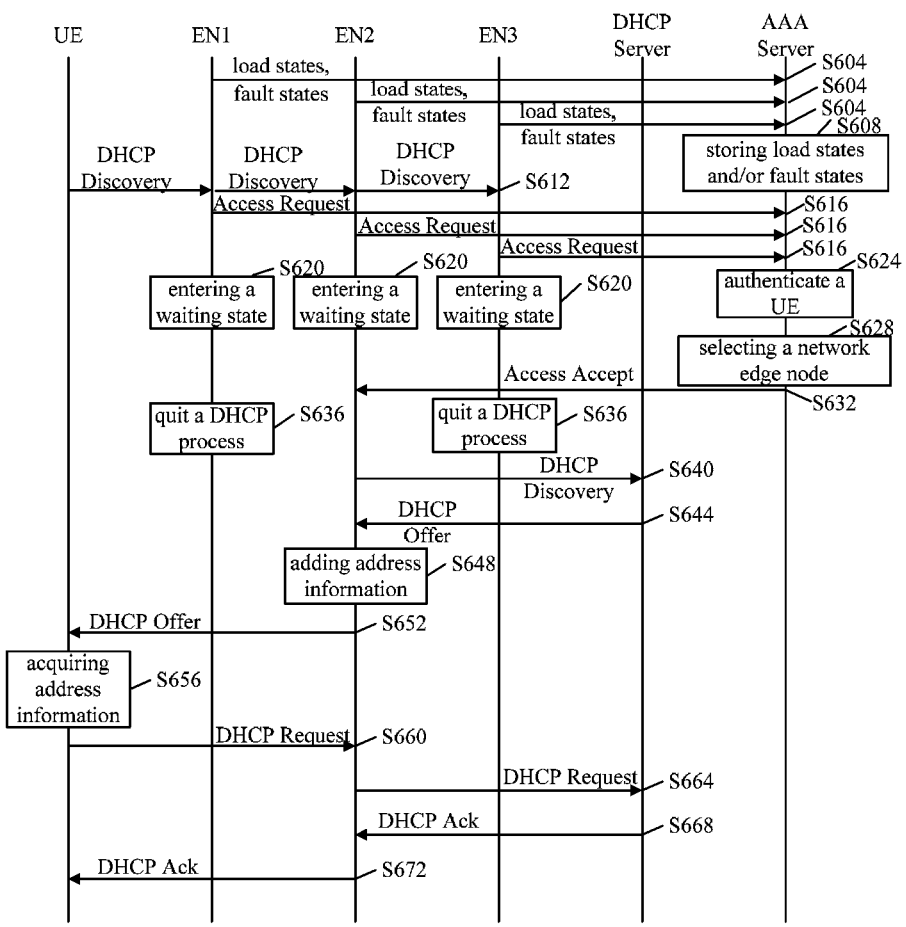
FIG. 6 shows a flow schematic diagram of a method for a load balance according to the fifth embodiment of the present invention.

Now refer to FIG. 6, which shows a flow schematic diagram of a method for a load balance according to the fifth embodiment of the present invention. In the fifth embodiment, a load balancing device is an AAA server which is taken as a user authentication device, and a user equipment in a residential network accesses a network by using a DHCP process. For convenience of description, it is supposed that a network edge node pool of an access network merely includes three network edge nodes EN1, EN2 and EN3, wherein the network edge nodes EN1, EN2 and EN3 may be but are not limited to a wireless gateway, BRAS, BNG or BSG. It should be understood for those skilled in the art that, it is merely for convenience of description to set the number of the network edge nodes in the network edge node pool as three in the embodiment. Actually, the network edge nodes in the network edge node pool may be in any number.

As shown in FIG. 6, in step S604, if load changes and/or fault states occur in the network edge nodes EN1, EN2 and/or EN3, the network edge nodes EN1, EN2 and/or EN3 send their load states and/or fault states to the AAA server which is taken as the load balancing device.

In step S608, when the load states and/or fault states from the network edge nodes EN1, EN2 and/or EN3 are received, the received load states and/or fault states are stored by the AAA server.

In step S612, if any user equipment UE in a residential network intends to access a network to acquire an desired service from a service provider SP, a DHCP Discovery message is broadcasted by the user equipment UE. The DHCP Discovery message broadcasted by the user equipment UE includes identification information of the user equipment UE, such as an access loop (like a line identifier) of the user equipment UE, an MAC address of the residential network of the user equipment UE or a VLAN identifier. In here, all the network edge nodes EN1, EN2 and EN3 in the network edge node pool may receive the DHCP Discovery message broadcasted by the user equipment UE.

In step S616, when the network edge nodes EN1, EN2 and EN3 receive the DHCP Discovery message from the user equipment UE, the network edge nodes EN1, EN2 and EN3 send access request messages respectively to the AAA server, in order to request user authentications of the user equipment UE. The sent Access Request message includes identification information of the user equipment UE. Since the Access Request message occurs when the user equipment UE intends to access the network, the Access Request message includes information indicating that the user equipment UE intends to access the network in the embodiment.

In step S620, when the Access Request message is sent to the AAA server, the network edge nodes EN1, EN2 and EN3 enter waiting states.

In step S624, when the Access Request message from the network edge nodes EN1, EN2 and EN3 is received, user authentications are performed on the user equipment UE by the AAA server.

In step S628, if the authentication of the user equipment UE has passed, a network edge node having the capacity of bearing a load to serve the user equipment UE is selected from the network edge node pool by the AAA server according to stored load states and fault states of the network edge nodes EN1, EN2 and EN3 in the network edge node pool.

In here, the AAA server may select the network edge node for serving the UE by using various load balancing strategies. For example, the AAA server may select a network edge node in the network edge nodes EN1, EN2 and EN3, which does not have a fault and has the smallest load to serve the user equipment UE. For another example, the AAA server may select a network edge node which has the capability of bearing a load and is closest to the user equipment UE to serve the user equipment UE. For another example, the AAA server may arrange, according to a certain rule, the network edge nodes EN1, EN2 and EN3 which do not have faults as follows: a first network edge node, a second network edge node and a third network edge node. When a user equipment intends to access a network every time, the first network edge node is always selected first to serve the user equipment UE which intends to access the network till the first network edge node is full of load and does not have the capability of bearing a load. Then the second network edge node is always selected to serve the user equipment UE which intends to access the network till the second network edge node is full of load and does not have the capability of bearing a load. Finally, the third network edge node is always selected to serve the user equipment UE which intends to access the network till the third network edge node is full of load and does not have the capability of bearing a load.

In step S632, an Access Accept (Access Accept) message is sent to the selected network edge node by the AAA server, to inform the selected network edge node to serve the user equipment UE. The Access Accept message sent by the AAA server includes a user authentication result of the user equipment UE and identification information of the user equipment UE. In here, it is supposed that the selected network edge node is the network edge node EN2.

In step S636, as the AAA server does not send the Access Accept message to the network edge nodes EN1 and EN3, the network edge nodes EN1 and EN3 quit DHCP processes of the user equipment UE when the waiting of the network edge nodes EN1 and EN3 timeouts. For example, the network edge nodes EN1 and EN3 may quit the DHCP process of the user equipment UE by abandoning a DHCP Discovery message from the user equipment UE.

In step S640, when the Access Accept message from the AAA server is received during the period of waiting state, the DHCP Discovery message received from the user equipment UE is sent to a DHCP server by the network edge node EN2.

In step S644, a DHCP Offer message is returned to the network edge node EN2 by the DHCP server.

In step S648, address information of the network edge node EN2 is added to the DHCP Offer message received from the DHCP server by the network edge node EN2, to inform the user equipment UE it is served by the network edge node EN2. For example, the network edge node EN2 may add address information of the network edge node EN2 by inserting a Router Option into the received DHCP Offer message.

In step S652, the DHCP Offer message including the address information of the network edge node EN2 is sent to the user equipment UE by the network edge node EN2.

In step S656, when the DHCP Offer message is received from the network edge node EN2, the address information of the network edge node EN2 is acquired from the received DHCP Offer message by the user equipment UE to know that it is served by the network edge node EN2.

In step S660, a DHCP Request message is sent, by the user equipment UE, to the network edge node EN2 serving the user equipment UE.

In step S664, when the DHCP Request message from the user equipment UE is received, the received DHCP Request message is forwarded to the DHCP server by the network edge node EN2.

In step S668, a DHCP Ack message is returned to the network edge node EN2 by the DHCP server.

In step S672, when the DHCP Ack message from the DHCP server is received, the received DHCP Ack message is sent to the user equipment UE by the network edge node EN2.

It should be understood for those skilled in the art that, although in the fifth embodiment, the network edge nodes EN1, EN2 and EN3 actively send load states and/or fault states to the AAA server which is taken as the load balancing device, the present invention is not limited to this. In some other embodiments of the present invention, when the AAA server selects the network edge node for serving the user equipment UE, the AAA server indicates the network edge nodes EN1, EN2 and EN3 to send the load states and/or fault states. Then the network edge nodes EN1, EN2 and EN3 send the load states and/or fault states to the AAA server.

It should be understood for those skilled in the art that, in the fifth embodiment, the network edge nodes EN1, EN2 and EN3 may send the load states to the AAA server which is taken as the load balancing device once the loads are changed or when the loads are changed and exceed a predefined load threshold.

It should be understood for those skilled in the art that, although in the fifth embodiment, when the user equipment UE passes a user authentication, the AAA server selects a network edge node for serving the user equipment UE, the present invention is not limited to this. In some other embodiments of the present invention, the AAA server may select the network edge node for serving the user equipment UE under the condition that a user authentication is not needed for the user equipment UE.

It should be understood for those skilled in the art that, although in the fifth embodiment, the network edge node EN2 which is selected for serving the user equipment UE informs, through sending the DHCP Offer message including address information of the network edge node EN2 to the user equipment UE, the user equipment UE it is served by the network edge node EN2, the present invention is not limited to this. In some other embodiments of the present invention, when the network edge node EN2 is selected for serving the user equipment UE, the network edge node EN2 may directly send a newly customized message including the address information of the network edge node EN2 to the user equipment UE to inform the user equipment UE it is served by the network edge node EN2.

It should be understood for those skilled in the art that, although in the fifth embodiment, the network edge node EN2 which is selected for serving the user equipment UE informs, through sending the DHCP Offer message including address information of the network edge node EN2 to the user equipment UE, the user equipment UE it is served by the network edge node EN2, the present invention is not limited to this. In some other embodiments of the present invention, the network edge node EN2 which is selected for serving the user equipment UE adds the address information of the network edge node EN2 to the DHCP Ack message (rather than the DHCP Offer message received from the DHCP server) received from the DHCP server. Then the network edge node EN2 sends the DHCP Ack message including the address information of the network edge node EN2 to the user equipment UE to inform the user equipment UE it is served by the network edge node EN2.

It should be understood for those skilled in the art that, although in the fifth embodiment, the AAA server starts selecting a network edge node for serving the user equipment UE when the Access Request messages sent by all the network edge nodes EN1, EN2 and EN3 are received, the present invention is not limited to this. In some other embodiments of the present invention, in order to accelerate the DHCP process of the user equipment UE, the AAA server may start selecting the network edge node for serving the user equipment UE when the Access Request message sent by any of the network edge nodes EN1, EN2 and EN3 is received. When the Access Request message sent by the selected network edge node is received, the AAA server sends the Access Accept message to the selected network edge node to inform the selected network edge node to serve the user equipment UE.

Figure 7:
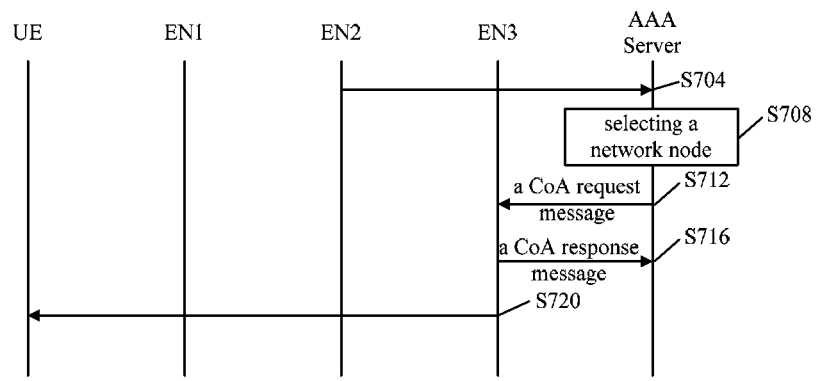
FIG. 7 shows a flow schematic diagram of a method for a load balance according to the sixth embodiment of the present invention.

Now refer to FIG. 7, which shows a flow schematic diagram of a method for a load balance according to the sixth embodiment of the present invention. In here, as in the fifth embodiment, for convenience of description, it is supposed that a network edge node pool of an access network merely includes three network edge nodes EN1, EN2 and EN3, and an AAA server is a load balancing device.

As shown in FIG. 7, in step S704, if any network edge node in a network edge node pool cannot continuously serve a user equipment currently served by it, a message indicating migrating the user equipment is sent to an AAA server which is taken as a load balancing device by the any network edge node, wherein the message includes identification information of the user equipment currently served by the any network edge node which needs to be migrated. In here, the any network edge node cannot continuously serve the user equipment due to the following reasons: a backup for a disaster recovery, a requirement for green energy-saving or an occurrence of a fault. For convenience of description below, it is supposed that the any network edge node is the network edge node EN2, and the user equipment currently served by the network edge node EN2 is the user equipment UE.

In step S708, when the message indicating migrating the a user equipment from the network edge node EN2 is received, a network edge node having the capacity of bearing a load to serve the user equipment UE being migrated is selected, according to the stored load states and fault states of the network edge nodes EN1, EN2 and EN3 in the network edge node pool, from the network edge node pool by the AAA server which is taken as the load balancing device. In here, it is supposed that the network edge node selected at this time is the network edge node EN3.

In step S712, a change of authorization request message (Change of Authorization (CoA) Request message (hereafter referred to as a CoA request message for short)) is sent to the selected network edge node EN3 by the AAA server which is taken as the load balancing device, to indicate the network edge node EN3 to serve the user equipment UE being migrated, wherein the CoA request message includes identification information of the user equipment UE being migrated.

In step S716, when the CoA request message from the AAA server is received, a change of authorization response message (Change of Authorization (CoA) response message (hereafter referred to as a CoA response message for short)) is sent to the AAA server by the network edge node EN3.

In step S720, when the CoA response message is sent to the AAA server, a message including address information of the network edge node EN3 is sent to the user equipment UE by the network edge node EN3, to inform the user equipment UE it is served by the network edge node EN3.

It should be understood for those skilled in the art that, although in the sixth embodiment, the AAA server indicates, through the CoA request message, the network edge node EN3 to serve the user equipment UE being migrated, the present invention however is not limited to this. In some other embodiments of the present invention, the AAA server may also indicate the network edge node EN3 to serve the user equipment UE being migrated through other messages.

Figure 8:
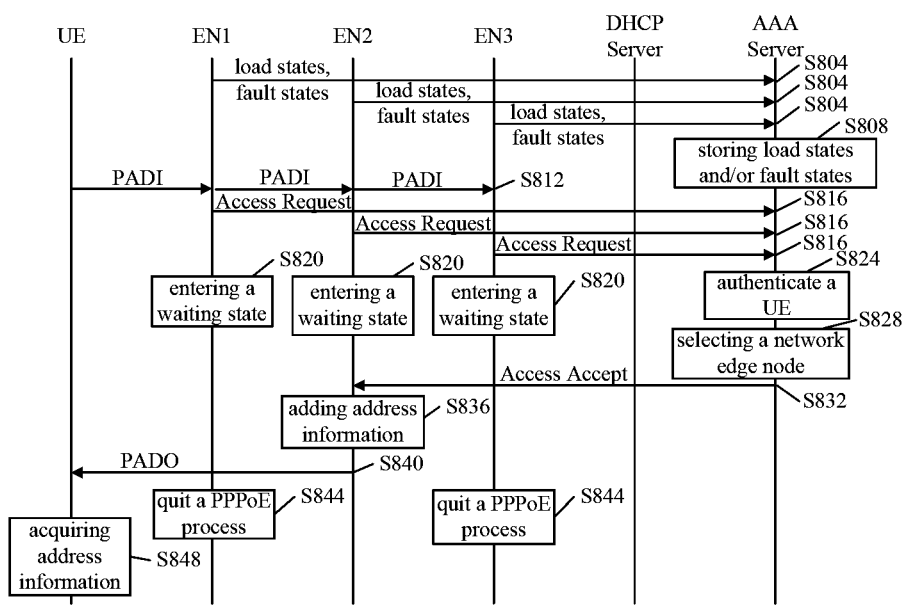
FIG. 8 shows a flow schematic diagram of a method for a load balance according to the seventh embodiment of the present invention.

Now refer to FIG. 8, which shows a flow schematic diagram of a method for a load balance according to the seventh embodiment of the present invention. In the fourth embodiment, a load balancing device is an AAA server, and a user equipment in a residential network accesses a network by using a PPPoE process. For convenience of description, it is supposed that a network edge node pool of an access network merely includes three network edge nodes EN1, EN2 and EN3, wherein the network edge nodes EN1, EN2 and EN3 may be but are not limited to a wireless gateway, BRAS, BNG or BSG. It should be understood for those skilled in the art that, it is merely for convenience of description in this embodiment to set the number of the network edge nodes in the network edge node pool as three. Actually, the network edge nodes in the network edge node pool may be in any number.

As shown in FIG. 8, in step S804, if load changes and/or faults occurs in the network edge nodes EN1, EN2 and/or EN3, their load states and/or fault states are sent to the AAA server which is taken as the load balancing device.

In step S808, when the load states and/or fault states from the network edge nodes EN1, EN2 and/or EN3 are received, the received load states and/or fault states are stored by the AAA server.

In step S812, if any user equipment UE in a residential network intends to access a network to acquire an desired service from an service provider SP, a PPPoE active discovery initiation stage of a PPPoE discovery stage is performed by the user equipment UE to broadcast a PADI (PPPoE discovery) message. The PADI message broadcasted by the user equipment UE includes identification information of the user equipment UE, such as an access loop (like a line identifier) of the user equipment UE, an MAC address of the residential network of the user equipment UE or a VLAN identifier. In here, all the network edge nodes EN1, EN2 and EN3 in the network edge node pool may receive the PADI message broadcasted by the user equipment UE. Since the PADI message is sent when the user equipment UE intends to access the network, in the embodiment the PADI message is a message including information indicating that the user equipment UE intends to access the network.

In step S816, when the network edge nodes EN1, EN2 and EN3 receive the PADI message from the user equipment UE, Access Request messages are sent to the AAA server by the network edge nodes EN1, EN2 and EN3 respectively, to request user authentications of the user equipment UE. The sent Access Request message includes identification information of the user equipment UE. Since the Access Request message is sent when a user equipment UE intends to access the network, in the embodiment, the Access Request message includes the information indicating that the user equipment UE intends to access the network.

In step S820, when the Access Request message is sent to the AAA server, the network edge nodes EN1, EN2 and EN3 enter waiting states.

In step S824, when the Access Request message from the network edge nodes EN1, EN2 and EN3 is received, a user authentication is performed to the user equipment UE by the AAA server.

In step S828, if the user authentication of UE passes, a network edge node having the capacity of bearing a load to serve the user equipment UE is selected from the network edge node pool by the AAA server according to stored load states and fault states of the network edge nodes EN1, EN2 and EN3 in the network edge node pool.

In here, the AAA server may select a network edge node for serving the user equipment UE by using various load balancing strategies. For example, the AAA server may select a network edge node which does not have a fault and has the smallest load to serve the user equipment UE in the network edge nodes EN1, EN2 and EN3. For another example, the AAA server may select the network edge node which has the capability of bearing a load and is closest to the user equipment UE to serve the user equipment UE. For another example, the AAA server may arrange, according to a certain rule, the network edge nodes EN1, EN2 and EN3 which do not have faults as follows: a first network edge node, a second network edge node and a third network edge node. When the user equipment UE intends to access the network each time, the first network edge node is always selected first to serve the user equipment UE which intends to access the network till the first network edge node is full of load and does not have the capability of bearing a load. Then the second network edge node is always selected to serve the user equipment UE which intends to access the network till the second network edge node is full of load and does not have the capability of bearing a load. Finally, the third network edge node is always selected to serve the user equipment UE which intends to access the network till the third network edge node is full of load and does not have the capability of bearing a load.

In step S832, an Access Accept message is sent to the selected network edge node by the AAA server, to inform the selected network edge node to serve the user equipment UE. The Access Accept message sent by the AAA server includes a user authentication result of the user equipment UE and identification information of the user equipment UE. In here, it is supposed that the selected network edge node is the network edge node EN2.

In step S836, when the network edge node EN2 receives the Access Accept message from the AAA server during the waiting state, a PADO stage of the PPPoE discovery stage is entered. Address information of the network edge node EN2 is added in a PADO message responding to the PADI message by the network edge node EN2, to inform the user equipment UE it is served by the network edge node EN2. In here, the address information of the network edge node EN2 may be an MAC address of the network edge node EN2.

In step S840, the PADO message including the address information of the network edge node EN2 is sent to the user equipment UE by the network edge node EN2.

In step S844, when the waiting of the network edge nodes EN1 and EN3 timeouts, a PPPoE process of the user equipment UE is quit by the network edge nodes EN1 and EN3. For example, the network edge node EN3 may quit the PPPoE process of the user equipment UE by abandoning the PADI message from the user equipment UE.

In step S848, when the PADO message is received from the network edge node EN2, the address information of the network edge node EN2 is acquired from the received PADO message by the user equipment UE, thereby knowing that it is served by the network edge node EN2.

Then, the user equipment UE completes other remaining operations of the PPPoE discovery stage under the service of the network edge node EN2, and enters a normal PPPoE data transmission stage. As the other remaining operations of the PPPoE discovery stage is known by those skilled in the art, it will not be described redundantly herein.

It should be understood for those skilled in the art that, although in the seventh embodiment, the network edge nodes EN1, EN2 and EN3 actively send load states and/or fault states to the AAA server which is taken as the load balancing device, the present invention is not limited to this. In some other embodiments of the present invention, the AAA server indicates the network edge nodes EN1, EN2 and EN3 to send the load states and fault states when the AAA server selects a network edge node for serving the user equipment UE. Then the network edge nodes EN1, EN2 and EN3 send the load states and fault states to the AAA server.

It should be understood for those skilled in the art that, in the seventh embodiment, the network edge nodes EN1, EN2 and EN3 may send the load states to the AAA server which is taken as the load balancing device once the loads are changed. The load states may also be sent to the AAA server when the loads are changed and exceed a predefined load threshold.

It should be understood for those skilled in the art that, although in the seventh embodiment, the network edge node EN2 which is selected for serving the user equipment UE informs, through sending the PADO message including address information of the network edge node EN2 to the user equipment UE, the user equipment UE it is served by the network edge node EN2, the present invention is not limited to this. In some other embodiments of the present invention, when the network edge node EN2 is selected for serving the user equipment UE, the network edge node EN2 directly sends a newly customized message including the address information of the network edge node EN2 to the user equipment UE to inform the user equipment UE it is served by the network edge node EN2.

It should be understood for those skilled in the art that, although in the seventh embodiment, the AAA server starts selecting the network edge node for serving the user equipment UE when the Access Request messages sent by all the network edge nodes EN1, EN2 and EN3 are received, the present invention is not limited to this. In some other embodiments of the present invention, in order to accelerate the PPPoE process of the user equipment UE, the AAA server starts selecting the network edge node for serving the user equipment UE when the Access Request message sent by any of the network edge nodes EN1, EN2 and EN3 is received. When the Access Request message sent by the selected network edge node is received, the AAA server sends the Access Accept message to the selected network edge node to inform the selected network edge node to serve the user equipment UE.

Figure 9:
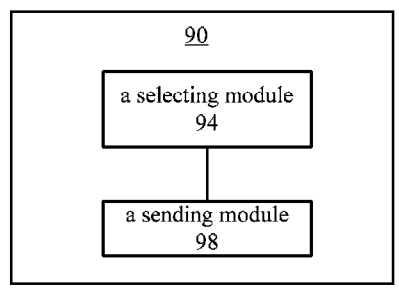
FIG. 9 shows a schematic diagram of a device for a load balance according to an embodiment of the present invention.

Now refer to FIG. 9, which shows a schematic diagram of a device for a load balance according to an embodiment of the present invention. The device 90 shown in FIG. 9 may be installed in a load balancing device and implemented in a software mode, a hardware mode or a software and hardware combination mode.

As shown in FIG. 9, the device 90 may include a selecting module 94 and a sending module 98. The selecting module 94 is configured to select a network edge node having a capacity of bearing a load to serve a user equipment UE1 from a network edge node pool of an access network according to load states and fault states of network edge nodes in the network edge node pool of the access network when a message including information indicating that the user equipment UE1 intends to access a network is received. The sending module 98 is configured to send a message for indicating the selected network edge node to serve the user equipment UE1 to the selected network edge node.

Further, the device 90 may further include a saving module, which is configured to store received load states and/or fault states if load states and/or fault states are received from each of the aforementioned network edge nodes. The selecting module 94 may be further configured to select, according to the stored load states and fault states, a network edge node having the capacity of bearing the load to serve the user equipment UE1 from the network edge node pool of the access network.

Furthermore, the selecting module 94 may further be configured to reselect, according to load states and fault states of each of aforementioned network edge nodes, another network edge node for serving the user equipment UE2 being migrated from the network edge node pool of the access network if a message indicating migrating a user equipment UE2 is received from any network edge node in the network edge node pool of the access network. And the sending module 98 is further configured to send a message for indicating the another network edge node to serve the user equipment UE2 being migrated to the another network edge node.

Further, the aforementioned message including information that the user equipment UE1 intends to access the network may be a DHCP Discover message, a PADI message or an Access Request message.

Figure 10:
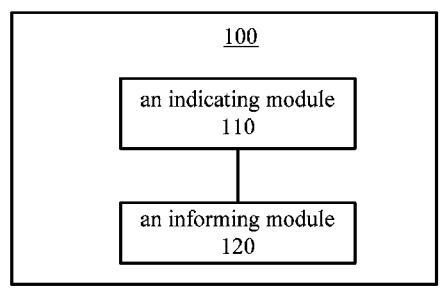
FIG. 10 shows a schematic diagram of a device for a load balance according to an embodiment of the present invention.

Now refer to FIG. 10, which shows a schematic diagram of a device for a load balance according to an embodiment of the present invention. The device 100 shown in FIG. 10 may be installed in a network edge node W of an access network, and may be implemented in a software mode, a hardware mode or a software and hardware combination mode.

As shown in FIG. 10, the device 100 may include an indicating module 110 and an informing module 120. The indicating module 110 is configured to indicate the network edge node W to enter a waiting state when a network edge node W of an access network receives a message including information indicating that user equipment UE1 intends to access a network. The informing module 120 is configured to inform, through the network edge node W, the user equipment UE1 it is served by the network edge node W if the network edge node W receives a message for indicating the network edge node W to serve the user equipment UE1 from a load balancing device J during the waiting state.

Further, the load balancing device J may be a network edge node in an access network, and the aforementioned message including information that the user equipment UE1 intends to access the network may be a DHCP Discover message. The indicating module 110 may be further configured to indicate the network edge node W to enter a waiting state when the network edge node W receives a user authentication result of the user equipment UE1 from a user authentication device when the aforementioned message is received. The informing module 120 may include a sending module and an adding module. The sending module is configured to send the DHCP Discover message to a DHCP server through the network edge node W if the network edge node W receives a message for indicating the network edge node W to serve the user equipment UE1 from the load balancing device J during the waiting state. The adding module is configured to add address information of the network edge node W to the received DHCP Offer message when the network edge node W receives a DHCP Offer message from the DHCP server. The sending module is further configured to send the DHCP Offer message including the address information of the network edge node W to the user equipment UE1 through the network edge node W.

Furthermore, the load balancing device J may be a user authentication device. The indicating module 110 may be further configured to indicate the network edge node W to enter a waiting state when the network edge node W sends an Access Request message for performing a user authentication to the user equipment UE1 to the load balancing device J when the aforementioned message including the information that the user equipment UE1 intends to access the network is received. The informing module 120 may be further configured to inform the user equipment UE1 it is served by the network edge node W through the network edge node W if the network edge node W receives an Access Accept message including a user authentication result of the user equipment UE1 from the load balancing device J during the waiting state.

Furthermore, the message including information indicating that the user equipment UE intends to access the network may be a DHCP Discovery message. The informing module 120 may include a sending module and an adding module. The sending module may be configured to send the DHCP Discover message to the DHCP server through the network edge node W if the network edge node W receives the Access Accept message from the load balancing device J during the waiting state. The adding module may be configured to add address information of the network edge node W to the DHCP Offer message when the network edge node W receives the DHCP Offer message from the DHCP server. The sending module is further configured to send the DHCP Offer message including the address information of the network edge node W to the user equipment UE1 through the network edge node W.

Furthermore, the aforementioned message including information indicating that the user equipment UE intends to access the network may be a PADI message. The informing module 120 may be further configured to send a PADO message including address information of the network edge node W to the user equipment UE1 through the network edge node W if the network edge node W receives the aforementioned Access Accept message from the load balancing device J during the waiting state.

Furthermore, the device 100 may further include a transmitting module, which is configured to send a message indicating migrating the currently served user equipment to the load balancing device J if the network edge node W cannot continuously serve the user equipment currently served by the network edge node W.

Furthermore, the informing module 120 may be further configured to inform, through the network edge node W, the user equipment UE2 being migrated it is served by the network edge node W if the network edge node W receives a message for indicating the network edge node W to serve the user equipment UE2 being migrated from the load balancing device J.

Figure 11:
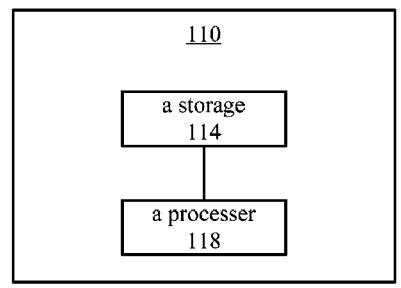
FIG. 11 shows a schematic diagram of a device for a load balance according to an embodiment of the present invention.

Now refer to FIG. 11, which shows a schematic diagram of a device for a load balance according to an embodiment of the present invention. As shown in FIG. 11, the load balancing device 110 includes a memory 114 for storing executable instructions and a processor 118.

The processor 118 executes following steps according to executable instructions stored by the memory 114: when a message including information indicating that the user equipment UE1 intends to access a network is received, according to load states and fault states of network edge nodes in a network edge node pool of an access network, a network edge node having the capacity of bearing a load to serve the user equipment UE1 is selected from the network edge node pool. And a message for indicating the selected network edge node to serve the user equipment UE1 is sent to the selected network edge node.

Furthermore, the processor 118 may further execute the following steps according to the executable instructions stored by the memory 114: the received load states and/or fault states are stored if load states and/or fault states of the aforementioned network edge nodes are received from the aforementioned network edge nodes. The aforementioned selecting step further includes: a network edge node having the capacity of bearing a load to serve the user equipment UE1 is selected from the aforementioned network edge node pool according to the stored load states and fault states.

Furthermore, the processor 118 may further execute the following steps according to the executable instructions stored by the memory 114: if a message indicating migrating the user equipment UE2 is received from any network edge node in the aforementioned network edge node pool, another network edge node for serving the user equipment UE2 being migrated is reselected, according to load states and fault states of the aforementioned network edge nodes, from the aforementioned network edge node pool. And a message for indicating the another network edge node to serve the user equipment UE2 being migrated is sent to the another network edge node.

Furthermore, the load balancing device 110 may be any network edge node in the aforementioned network edge node pool and the aforementioned message including information that the user equipment UE1 intends to access the network may be a DHCP Discover message or a PADI message. Or, the load balancing device 110 may be a user authentication device and the aforementioned message including the information that the user equipment UE1 intends to access the network may be an Access Request message.

Figure 12:
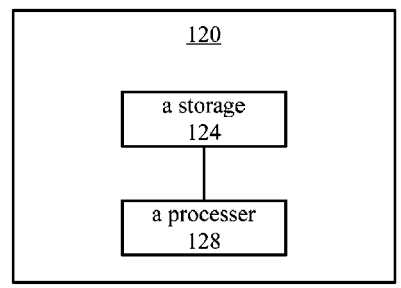
FIG. 12 shows a schematic diagram of a network edge node of an access network according to an embodiment of the present invention.

Now refer to FIG. 12, which shows a schematic diagram of a network edge node of an access network according to an embodiment of the present invention. As shown in FIG. 12, the network edge node 120 may include a memory 124 for storing executable instructions and a processor 128.

The processor 128 may execute the following steps according to the executable instructions stored in the memory 124: when a message including information indicating that a user equipment UE1 intends to access the network is received, a waiting state is entered. And if a message for indicating the network edge node 120 to serve the user equipment UE1 from a load balancing device J is received during the waiting state, the user equipment UE1 is informed that it is served by the network edge node 120.

Furthermore, the load balancing device J may be a network edge node in the access network, and the message including information that the user equipment UE1 intends to access the network may be a DHCP Discover message. The aforementioned step of entering the waiting state may further include: when the user authentication result of the user equipment UE1 is received from a user authentication device when the message is received, the waiting state is entered. The aforementioned informing step may include: if the message for indicating the network edge node 120 to serve the user equipment UE1 is received from the load balancing device J during the waiting state, the DHCP Discover message is sent to a DHCP server. When a DHCP Offer message is received from the DHCP server, address information of the network edge node 120 is added in the received DHCP Offer message. And the DHCP Offer message including the address information of the network edge node 120 is sent to the user equipment UE1 through the network edge node W.

Furthermore, the load balancing device J may be a user authentication device. The aforementioned step of entering the waiting state may further include: when an Access Request message for performing a user authentication of the user equipment UE1 is sent to the load balancing device J when the message including information that the user equipment UE1 intends to access the network is received, the waiting state is entered. The aforementioned informing step may further include: if an Access Accept message including the user authentication result of the user equipment UE1 is received from the load balancing device J during the waiting state, the user equipment UE1 is informed that it is served by the network edge node 120.

Furthermore, the aforementioned message including the information indicating that the user equipment intends to access the network may be a DHCP Discovery message. The aforementioned informing step may include: if the Access Accept message is received from the load balancing device J during the waiting state, the aforementioned DHCP Discover message is sent to the DHCP server. When the DHCP Offer message is received from the DHCP server, address information of the network edge node 120 is added in the received DHCP Offer message. And the DHCP Offer message including the address information of the network edge node 120 is sent to the user equipment UE1.

Furthermore, the aforementioned message including information indicating that the user equipment intends to access the network may be a PADI message. The aforementioned informing step may further include: if the aforementioned Access Accept message is received from the load balancing device J during the waiting state, a PADO message including the address information of the network edge node 120 is sent to the user equipment UE 1.

Furthermore, the processor 128 may execute the following step according to the executable instructions stored by the memory 124: if the network edge node 120 cannot continuously serve the user equipment currently served by the network edge node 120, a message indicating migrating the currently served user equipment is sent to the load balancing device J.

Furthermore, the processor 128 may execute the following step according to the executable instructions stored by the memory 124: if a message for indicating the network edge node 120 to serve the user equipment UE2 being migrated is received from the load balancing device J, the user equipment UE2 being migrated is informed that it is served by the network edge node 120.

An embodiment of the present invention discloses a machine readable medium, on which executable instructions stored. When the executable instructions are executed, a machine executes the following steps: when a message including information indicating that a user equipment UE1 intends to access a network is received, according to load states and fault states of network edge nodes in a network edge node pool of an access network, a network edge node having the capacity of bearing a load is selected to serve the user equipment UE1 from the network edge node pool of the access network. And a message for indicating the selected network edge node to serve the user equipment UE1 is sent to the selected network edge node.

Furthermore, when the aforementioned executable instructions are executed, the machine executes the following steps: if load states and/or fault states are received from the aforementioned network edge nodes, the received load states and/or fault states are stored. The aforementioned selecting step may further include: according to the stored load states and fault states, a network edge node having the capacity of bearing a load to serve the user equipment UE1 is selected from the aforementioned network edge node pool of the access network.

Furthermore, when the aforementioned executable instructions are executed, the machine executes the following steps: if a message indicating migrating the user equipment UE2 is received from any network edge node in the network edge node pool of the access network, according to the load states and fault states of the aforementioned network edge nodes, another network edge node for serving the a user equipment UE2 being migrated is reselected from the network edge node pool of the access network; and a message for indicating the another network edge node to serve the user equipment UE2 being migrated is sent to another network edge node.

Furthermore, the aforementioned message including information that the user equipment UE1 intends to access the network may be a DHCP Discover message, a PADI message or an Access Request message.

An embodiment of the present invention discloses a machine readable medium, on which executable instructions are stored. When the executable instructions are executed, a machine executes the following steps: when a network edge node W of an access network receives a message including information indicating that a user equipment UE1 intends to access the network, the network edge node W is indicated to enter a waiting state. And if the network edge node W receives a message for indicating the network edge node W to serve the user equipment UE1 from a load balancing device J during the waiting state, the user equipment UE1 is informed that it is served by the network edge node W through the network edge node W.

Furthermore, the load balancing device J may be a network edge node in the access network, and the aforementioned message including information that the user equipment UE1 intends to access the network may be a DHCP Discover message. The aforementioned indicating step may further include: when the network edge node W receives a user authentication result of the user equipment UE1 from a user authentication device when the message is received, the network edge node W is indicated to enter a waiting state. The aforementioned informing step may include: if the network edge node W receives the message for indicating the network edge node W to serve the user equipment UE1 from the load balancing device J during the waiting state, the DHCP Discover message is sent to a DHCP server through the network edge node W. When the network edge node W receives a DHCP Offer message from the DHCP server, address information of the network edge node W is added in the received DHCP Offer message. And the DHCP Offer message including the address information of the network edge node W is sent to the user equipment UE1 through the network edge node W.

Furthermore, the load balancing device J may be a user authentication device. The aforementioned indicating step may further include: when the network edge node W sends an Access Request message for performing a user authentication of the user equipment UE1 to the load balancing device J when the message including information that the user equipment UE1 intends to access the network is received, the network edge node W is indicated to enter a waiting state. The aforementioned informing step may further include: if the network edge node W receives an Access Accept message including a user authentication result of the user equipment UE1 from the load balancing device J during the waiting state, the user equipment UE1 is informed that it is served by the network edge node W through the network edge node W.

Furthermore, the aforementioned message including the information indicating that a user equipment intends to access the network may be a DHCP Discovery message. The aforementioned informing module may include: if the network edge node W receives the Access Accept message from the load balancing device J during the waiting state, the DHCP Discover message is sent to the DHCP server by the network edge node W. When the network edge node W receives the DHCP Offer message from the DHCP server, address information of the network edge node W is added in the received DHCP Offer message. And the DHCP Offer message including address information of the network edge node W is sent to the user equipment UE1 by the network edge node W.

Furthermore, the aforementioned message including the information indicating that the user equipment intends to access the network may be a PADI message. The aforementioned informing module may further include: if the network edge node W receives the Access Accept message from the load balancing device J during the waiting state, a PADO message including address information of the network edge node W is sent to the user equipment UE1 through the network edge node W.

Furthermore, when the aforementioned executable instructions are executed, the machine executes the following step: if the network edge node W cannot continuously serve a user equipment currently served by the network edge node W, a message indicating migrating the currently served user equipment is sent to the load balancing device J.

Furthermore, when the aforementioned executable instructions are executed, the machine executes the following step: if the network edge node W receives a message for indicating the network edge node W to serve the user equipment UE2 being migrated from the load balancing device J, the user equipment UE2 being migrated is informed it is served by the network edge node W through the network edge node W.

It should be understood for those skilled in the art that, various changes and modifications may be made to each embodiment of the present invention without departing from the essence of the present invention. Accordingly, the protection scope of the present invention should be defined by the attached claims.

What is claimed is:

1. A method for load balancing, comprising:
in response to a second network edge node of an access network receiving a message including information indicating that a user equipment intends to access a network, causing the second network edge node to enter a waiting state;
in response to the second network edge node receiving during the waiting state, from a device, a message indicating that the second network edge node is requested to serve the user equipment, transmitting a message to the user equipment, through the second network edge node, indicating that the user equipment is served by the second network edge node;
wherein the device is a first network edge node in the access network, and the message including the information that the user equipment intends to access the network is an address allocation discovery message,
wherein the causing the second network edge node to enter the waiting state further comprises: in response to the second network edge node receiving a user authentication result of the user equipment from a user authentication device after the message is received, causing the second network edge node to enter the waiting state, and
wherein the transmitting the message to the user equipment, through the second network edge node, that the user equipment is served by the second network edge node comprises:
sending, if the second network edge node receives the message for indicating the second network edge node is requested to serve the user equipment from the device during the waiting state, the address allocation discovery message, through the second network edge node, to a dynamic host configuration protocol server;
adding, when the second network edge node receives an address allocation service confirmation message from the dynamic host configuration protocol server, address information of the second network edge node in the address allocation service confirmation message; and
sending, through the second network edge node, the address allocation service confirmation message including the address information of the second network edge node to the user equipment.

2. The method of claim 1, further comprising:
sending, if the second network edge node cannot continuously serve the user equipment that the second network edge node currently serves, a message to the device indicating migrating the user equipment.

3. The method of claim 1, further comprising:
if the second network edge node receives, from the device, a message requesting the second network edge node to serve a user equipment being migrated, informing the user equipment being migrated, through the second network edge node, that the user equipment is served by the second network edge node.

4. A method for load balancing, comprising:
in response to a network edge node of an access network receiving a message including information indicating that a user equipment intends to access a network, causing the network edge node to enter a waiting state;
in response to the network edge node receiving during the waiting state, from a device, a message indicating that the network edge node is requested to serve the user equipment, transmitting a message to the user equipment, through the network edge node, indicating that the user equipment is served by the network edge node;
wherein the device is a user authentication device,
wherein the causing the network edge node to enter the waiting state further comprises: in response to the network edge node sending an access request message, which is used for indicating a user authentication of the user equipment, to the device after the message including the information indicating that the user equipment intends to access the network is received, causing the network edge node to enter the waiting state, and
wherein the transmitting the message to the user equipment, through the network edge node, that the user equipment is served by the network edge node further comprises: informing, if the network edge node receives an access accept message including a user authentication result of the user equipment from the device during the waiting state, the user equipment, through the network edge node, that the user equipment is served by the network edge node.

5. The method of claim 4,
wherein the message including the information indicating that the user equipment intends to access the network is an address allocation discovery message, and
wherein the transmitting the message to the user equipment, through the network edge node, that the user equipment is served by the network edge node comprises:
sending, if the network edge node receives the access accept message from the device during the waiting state, the address allocation discovery message, through the network edge node, to a dynamic host configuration protocol server;
adding, when the network edge node receives an address allocation service confirmation message from the dynamic host configuration protocol server, address information of the network edge node in the address allocation service confirmation message; and
sending, through the network edge node, the address allocation service confirmation message including the address information of the network edge node to the user equipment.

6. The method of claim 4,
wherein the message including the information indicating that the user equipment intends to access the network is a point-to-point protocol over ethernet discovery (PADI) message, and
wherein the transmitting the message to the user equipment, through the network edge node, that the user equipment is served by the network edge node comprises: sending, if the network edge node receives the access accept message from the device during the waiting state, a point-to-point protocol over ethernet active discovery offer (PADO) message, which includes address information of the network edge node, to the user equipment through the network edge node.

7. The method of claim 4, further comprising:
sending, if the network edge node cannot continuously serve the user equipment that the network edge node currently serves, a message to the device indicating migrating the user equipment.

8. The method of claim 4, further comprising:
if the network edge node receives, from the device, a message requesting the network edge node to serve a user equipment being migrated, informing the user equipment being migrated, through the network edge node, that the user equipment is served by the network edge node.

9. A device for load balancing, comprising:
a memory storing executable instructions; and
a processor configured to execute the executable instructions to:
indicate to a second network edge node, when the second network edge node of an access network receives a message including information indicating that a user equipment intends to access a network, to enter a waiting state, wherein the second network edge node is the device for load balancing;
inform the user equipment, in response to the second network edge node receiving during the waiting state, from a device, a message indicating that the second network edge node is requested to serve the user equipment, through the second network edge node, that the user equipment is served by the second network edge node, wherein the device is a first network edge node in the access network, and the message including the information that the user equipment intends to access the network is an address allocation discovery message;
indicate, when the second network edge node receives a user authentication result of the user equipment from a user authentication device after the message including the information is received, the second network edge node to enter the waiting state;
send, if the second network edge node receives a message for indicating the second network edge node to serve the user equipment from the device during the waiting state, the address allocation discovery message, through the second network edge node, to a dynamic host configuration protocol server;
add, when the second network edge node receives an address allocation service confirmation message from the dynamic host configuration protocol server, address information of the second network edge node to the address allocation service confirmation message; and
send, through the second network edge node, the address allocation service confirmation message including the address information of the second network edge node to the user equipment.

10. A device for load balancing, comprising:
a memory storing executable instructions; and
a processor configured to execute the executable instructions to:
indicate to a network edge node, when the network edge node of an access network receives a message including information indicating that a user equipment intends to access a network, to enter a waiting state;
inform the user equipment, in response to the network edge node receiving during the waiting state, from a device, a message indicating that the network edge node is requested to serve the user equipment, through the network edge node, that the user equipment is served by the network edge node;
indicate, when the network edge node sends an access request message indicating a user authentication of the user equipment to the device after the message is received, the network edge node to enter the waiting state; and
inform, if the network edge node receives an access accept message including a user authentication result of the user equipment from the device during the waiting state, the user equipment, through the network edge node, that the user equipment is served by the network edge node.

11. The device of claim 10,
wherein the message including information indicating that the user equipment intends to access the network is an address allocation discovery message;
wherein the processor is further configured to execute the executable instructions to:
send, if the network edge node receives an access accept message from the device during the waiting state, the address allocation discovery message to a dynamic host configuration server through the network edge node, and
add, when the network edge node receives an address allocation service confirmation message from the dynamic host configuration server, address information of the network edge node in the address allocation service confirmation message; and
send, through the network edge node, the address allocation service confirmation message including address information of the network edge node to the user equipment.

12. The device of claim 10,
wherein the message including information indicating that the user equipment intends to access the network is a point-to-point protocol over ethernet discovery (PADI) message,
wherein the processor is further configured to execute the executable instructions to:
send, if the network edge node receives the access accept message from the device during the waiting state, a point-to-point protocol over ethernet active discovery offer (PADO) message including address information of the network edge node to the user equipment through the network edge node.

* * * * *